(12) United States Patent
Krajenke

(10) Patent No.: US 7,533,922 B1
(45) Date of Patent: May 19, 2009

(54) VEHICLE ENDGATE COUNTERBALANCE

(75) Inventor: Gary W. Krajenke, Warren, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/923,712

(22) Filed: Oct. 25, 2007

(51) Int. Cl.
B62D 25/00 (2006.01)
(52) U.S. Cl. .................................. 296/57.1; 296/37.6
(58) Field of Classification Search ............... 296/57.1, 296/61, 37.6, 50, 56, 51
See application file for complete search history.

(56) References Cited

U.S. PATENT DOCUMENTS

| 3,713,472 | A | * | 1/1973 | Dozois | 296/56 |
| 4,427,231 | A | * | 1/1984 | Smith | 296/56 |
| 5,358,301 | A | * | 10/1994 | Konchan et al. | 296/59 |
| 5,909,921 | A | * | 6/1999 | Nesbeth | 296/37.6 |
| 6,769,729 | B1 | * | 8/2004 | Bruford et al. | 296/57.1 |
| 6,773,047 | B2 | | 8/2004 | Gruber | |
| 7,093,876 | B2 | * | 8/2006 | Romig et al. | 296/57.1 |
| 7,243,977 | B2 | * | 7/2007 | McIntyre et al. | 296/146.8 |
| 7,287,799 | B2 | * | 10/2007 | Austin | 296/57.1 |
| 7,407,213 | B2 | * | 8/2008 | Eschebach et al. | 296/57.1 |
| 2002/0167188 | A1 | * | 11/2002 | Zagaroff | 296/57.1 |
| 2004/0178651 | A1 | * | 9/2004 | Austin | 296/57.1 |
| 2008/0197650 | A1 | * | 8/2008 | Stratten et al. | 296/57.1 |

* cited by examiner

Primary Examiner—Kiran B. Patel

(57) ABSTRACT

A vehicle having an endgate counter balance for use with an endgate of the vehicle, and a method of operating, is disclosed. The endgate counterbalance may include a hinge arm extending from the hinge, an energy storage device and a crank mechanism connected between the hinge arm and the energy storage device. The endgate counterbalance is configured to create a cross-over position for the endgate between closed and fully open where the endgate counterbalance does not exert a rotational bias on the endgate.

8 Claims, 5 Drawing Sheets

VEHICLE ENDGATE COUNTERBALANCE

BACKGROUND OF INVENTION

The present invention relates generally to vehicle endgates, and more particularly to a counterbalance for a vehicle endgate.

Conventional pickup trucks have an endgate that pivots from a vertical closed position rearward and downward to a horizontal open position for ease in loading and unloading cargo from the bed of the pickup. For some people, however, the amount of effort required to lift the endgate from its open position in order to close it is undesirably high. Thus, some pickup manufacturers have added mechanisms to assist in lifting the tailgate from its open position while one is closing the endgate.

For example, some have added torsion rods or vertically extending gas cylinders connected to the endgate hinge assembly. These devices store energy as the endgate is moved from its closed position to its fully open position, with the energy being used to assist a person when closing the endgate. While the torsion rod provides assist with lift effort, it does not provide any damping effect, which may be desirable when moving the endgate between its open and closed positions. The gas cylinder also has drawbacks in that it may interfere with the tail lamp housing, creating a packaging problem within the vehicle. Moreover, neither of these designs assists with maintaining the endgate (and hinge) in a position desirable for removal of the endgate from (and reassembly of the endgate to) the vehicle.

SUMMARY OF INVENTION

An embodiment contemplates an endgate counter balance for use with an endgate of a vehicle having a hinge about which the endgate pivots between a closed position and a fully open position. The endgate counterbalance may comprise a hinge arm, an energy storage device and a crank mechanism. The hinge arm may extend from the hinge and be pivotally fixed relative to the endgate. The energy storage device may have a first end and a second end configured to mount to vehicle structure, and be configured to store and dissipate potential energy as the first end is moved relative to the second end. The crank mechanism may include a hinge pivot link, having a first leg and a second leg, and a crank pivot link, having a first leg, a second leg and a pivot location at an intersection of the first and second pivot legs of the crank pivot link. The first leg of the hinge pivot link is pivotally attached to the hinge arm, the second leg of the hinge pivot link is pivotally attached to the first leg of the crank pivot link, the second leg of the crank pivot link is pivotally attached to the energy storage device, and the pivot location is configured to pivotally mount to the vehicle structure.

An embodiment contemplates a vehicle including vehicle structure having an endgate with a hinge pivotally mounted thereto and movable between a closed position and a fully open position. The vehicle also has an endgate counterbalance including a hinge arm extending from the hinge and pivotally fixed relative to the endgate; an energy storage device having a first end and a second end configured to mount to vehicle structure, the energy storage device configured to store and dissipate potential energy as the first end is moved relative to the second end; and a crank mechanism pivotally connected between the hinge arm and the energy storage device. The endgate counterbalance is configured to provide no rotational bias to the endgate when the endgate is in a cross-over position between the closed position and the fully open position and to provide a rotational bias to the endgate when the endgate is not in the cross-over position.

An embodiment contemplates a method of moving an endgate of a vehicle between a closed position and a fully open position, the method comprising the steps of: inducing a zero rotational bias by an endgate counterbalance on the vehicle endgate when the vehicle endgate is in a cross-over position located between the closed position and the fully open position; inducing a rotational bias away from the closed position by the endgate counterbalance when the endgate is located between the cross-over position and the closed position; and inducing a rotational bias away from the open position by the endgate counterbalance when the endgate is located between the cross-over position and the fully open position.

An advantage of an embodiment is that the endgate counterbalance assists with lifting the endgate during a closing event by reducing the effort during the initial portion of endgate travel from its horizontal while also assisting in reducing potential squeak and rattle issues by preloading latches that keep the endgate in its closed position. An embodiment may also include the provision for damping during endgate opening and also during the last portion of motion into the fully closed position.

An advantage of an embodiment is that the endgate counterbalance provides a cross-over position when partially opened that allows for easier removal and re-installation of the endgate to the vehicle.

DETAILED DESCRIPTION

Figure 1:
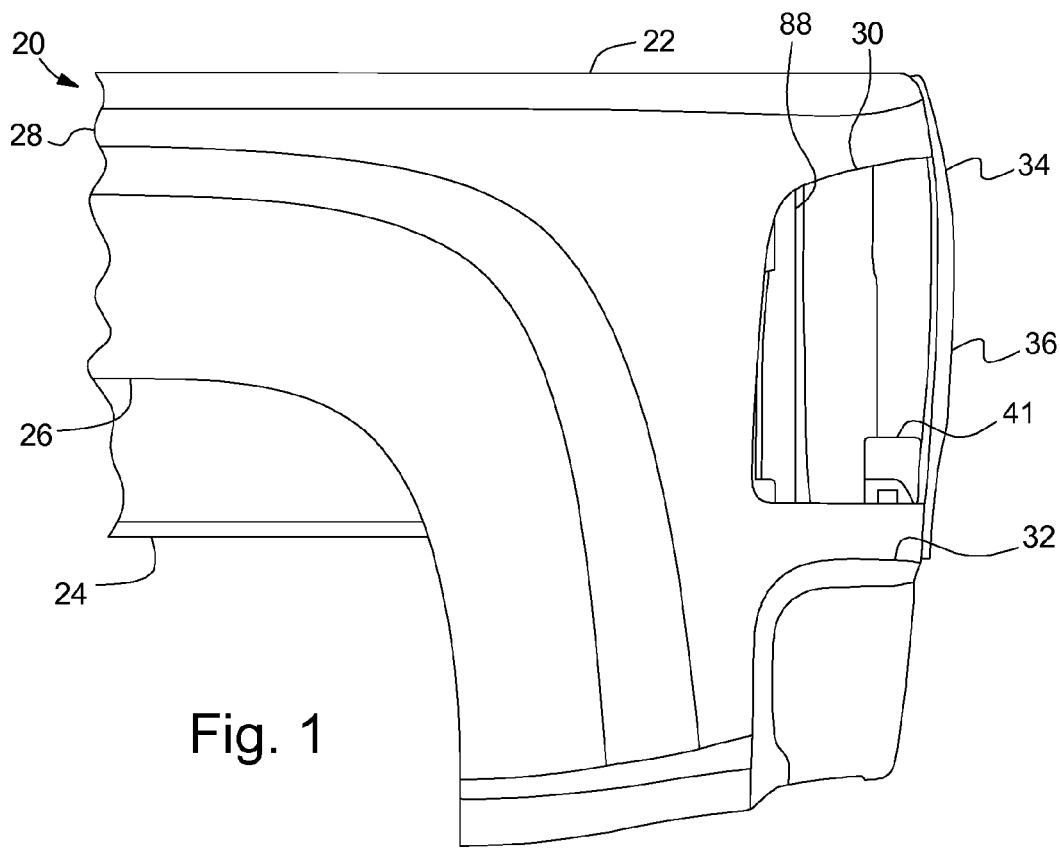
FIG. 1 is a side view looking inboard at a portion of a pickup truck.
Figure 2:
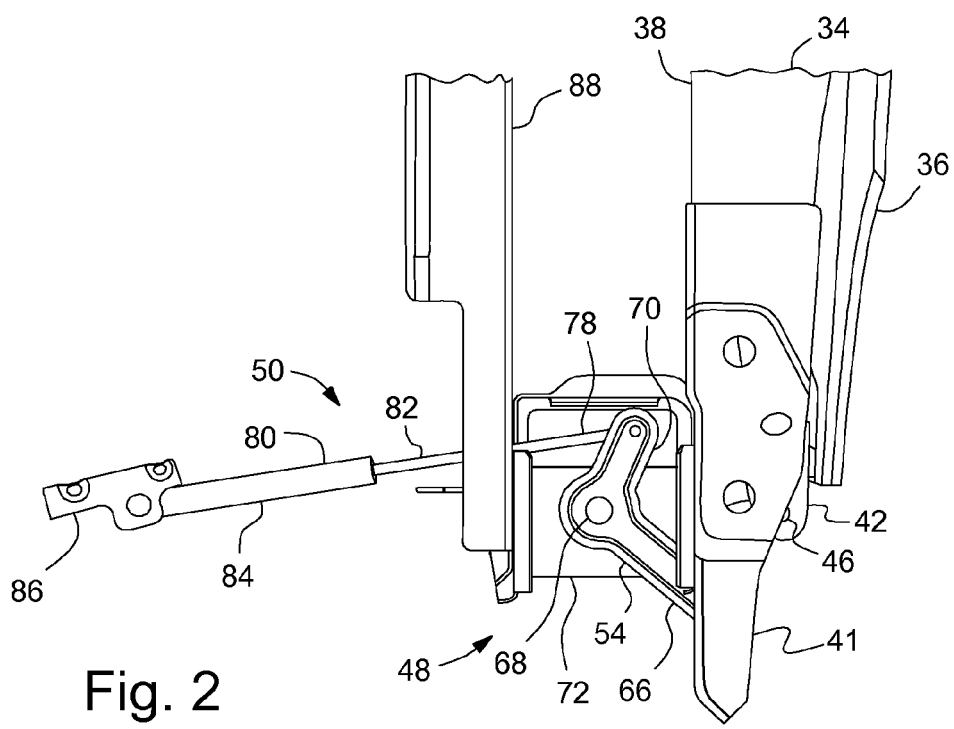
FIG. 2 is a side view of a portion of a pickup truck, including part of an endgate and an endgate counterbalance.
Figure 3:
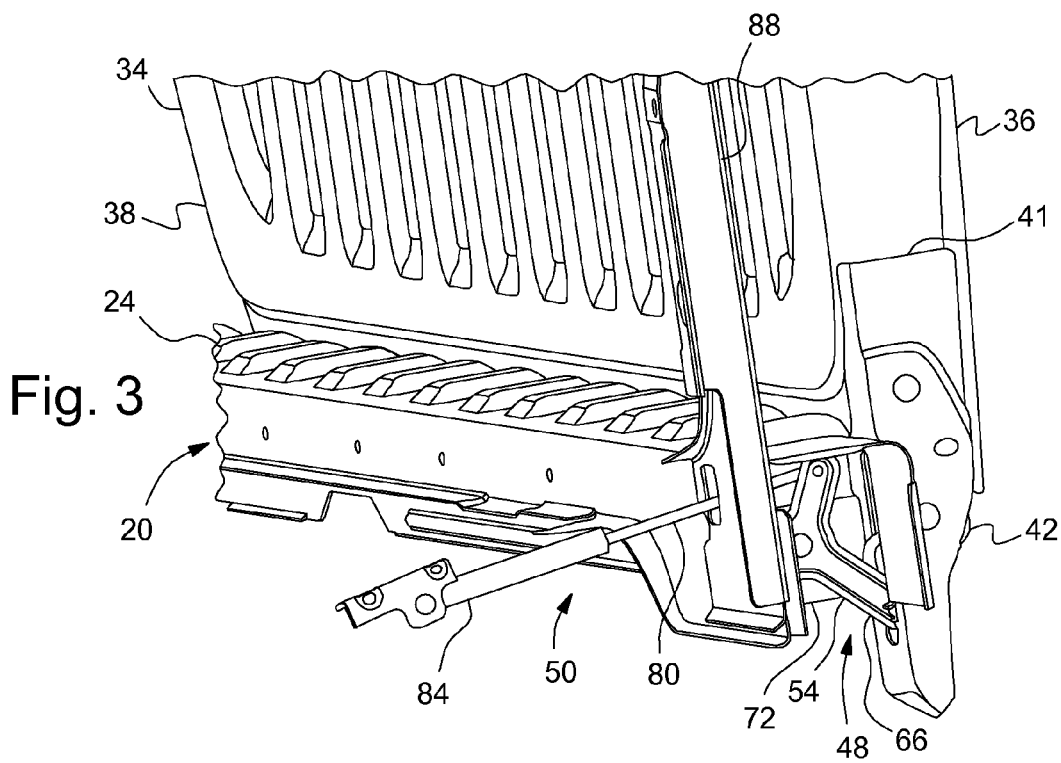
FIG. 3 is a perspective view looking aft and inboard at a portion of a pickup truck.
Figure 4:
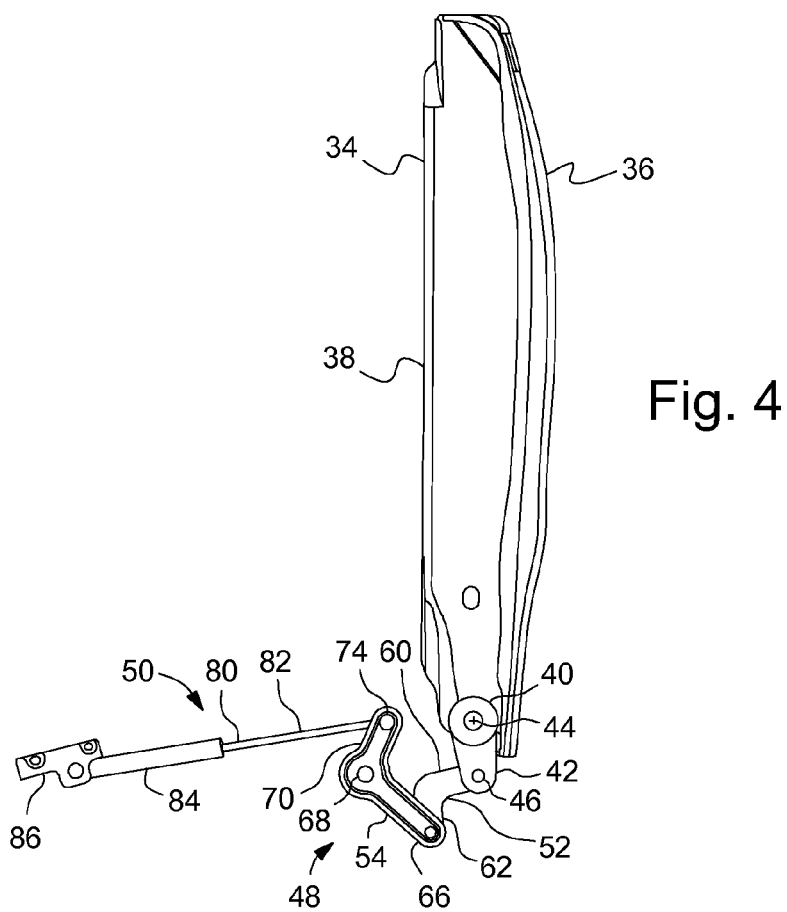
FIG. 4 is a side view of an endgate and endgate counterbalance, in an endgate closed position.

Referring to FIG. 1, a portion of a vehicle (pickup truck) body, indicated generally at 20, is shown. The body 20 includes a box 22 having a box bed 24 (i.e., the floor of the box 22), which can be seen located inboard of a wheel well opening 26 in a rear quarter panel 28. The rear quarter panel 28 also includes a brake light opening 30 and a recess 32 within which a bumper (not shown) extends. The pickup body 20 has an endgate 34 mounted at the rearmost portion of the box 22.

Figure 5:
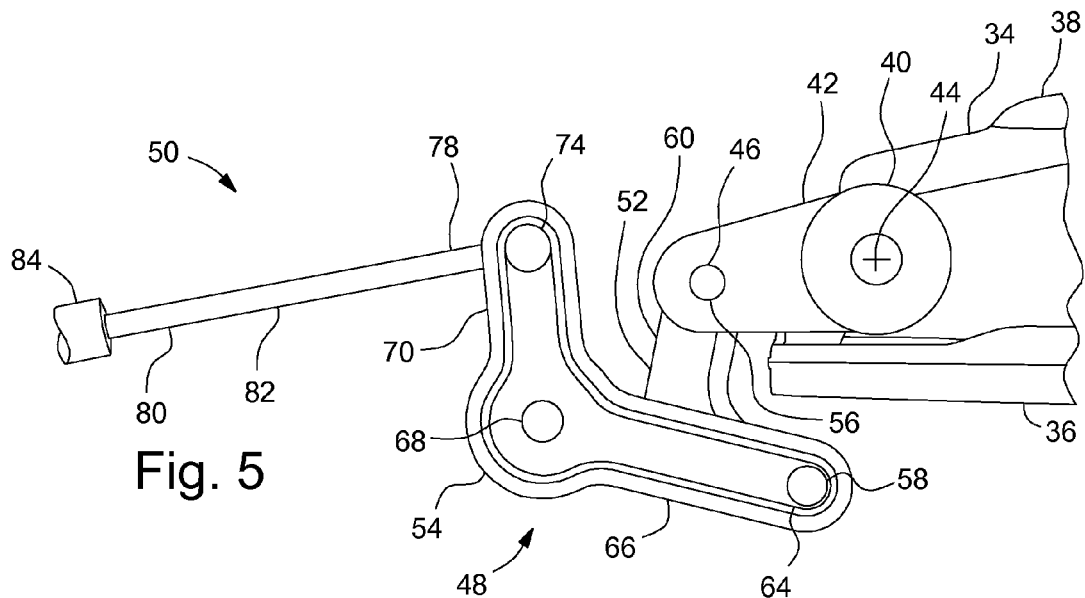
FIG. 5 is a side view of a portion of an endgate and endgate counterbalance, in an endgate open position.

Referring now to FIGS. 1-5, the endgate 34 is shown in both a vertical, closed position (FIGS. 1-4) and a horizontal, fully open position (FIG. 5). The endgate 34 has an aft (outer) surface 36 and a forward (inner) surface 38. A conventional latch assembly (not shown) may be employed to hold the endgate 34 in its closed position, and a conventional cable assembly (not shown) may be employed to hold the endgate 34 in its fully open position. The endgate 34 also includes a pair of hinges 40 (only one shown) pivotally connected to box side hinge structure 41 and defining a pivot axis 44 about which the endgate 34 pivots. When referring herein to two components being pivotally connected, this means that they are connected together but can pivot relative to one another. Such an arrangement may be achieved, for example, when the components have aligned holes, with a rivet or bolt extending through the holes, thus holding the components together while allowing them to pivot about the rivet/bolt axis.

A hinge arm 42 extends laterally from the hinge 40 and is pivotally fixed relative to the endgate 34. The hinge arm 42 includes a crank attachment hole 46 for pivotally connecting to a crank mechanism 48 of an endgate counterbalance 50.

The crank mechanism 48 includes an L-shaped hinge pivot link 52 and an L-shaped crank pivot link 54. The hinge pivot link 52 includes a first pivot hole 56, through a first leg 60, that pivotally connects to the crank attachment hole 46 and a second pivot hole 58, through a second leg 62, that pivotally connects to a first pivot hole 64 in a first leg 66 of the crank pivot link 54. The crank pivot link 54 also includes a body pivot hole 68 located at an intersection of the first leg 66 and a second leg 70. The body pivot hole 68 is used to pivotally mount the crank pivot link 54 to structure 72, which is fixed relative to the body 20. The second leg 70 includes a second hole 74 that pivotally connects to a first end 78 of an energy storage device 80, which is also part of the endgate counterbalance 50.

The energy storage device 80 in the first embodiment is a gas strut, which includes a rod 82. The first end 78 of the rod 82 is attached to the crank mechanism 48 with the rod 82 extending through box side structure 88, and telescopically mounting in a gas cylinder 84. The gas cylinder 84 is pivotally mounted to a mounting bracket 86 that mounts to vehicle structure under the box bed 24. The crank mechanism 48 allows the gas strut 80 to extend forward in a generally horizontal orientation. Thus, packaging concerns relating to a vertically mounted gas strut and tail lamp assembly (not shown) are avoided. Moreover, in the case of a gas strut, this particular energy storage device 80 also provides a damping function while one is pivoting the endgate 34.

Figure 6:
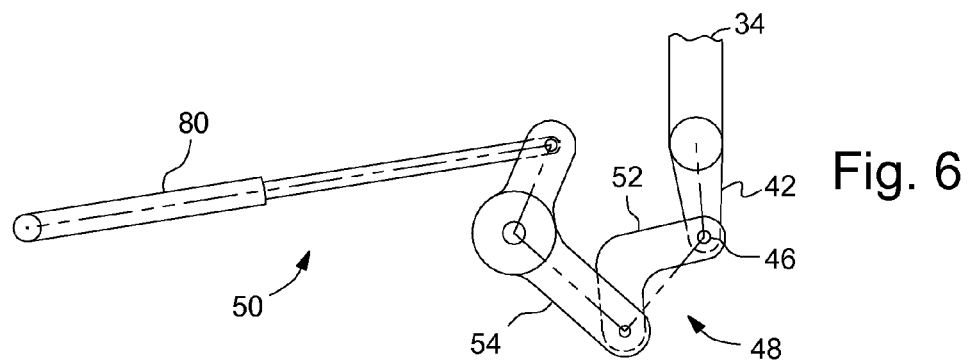
FIG. 6 is a schematic side view of the geometry for a portion of the endgate and endgate counterbalance, in the endgate closed position.
Figure 7:
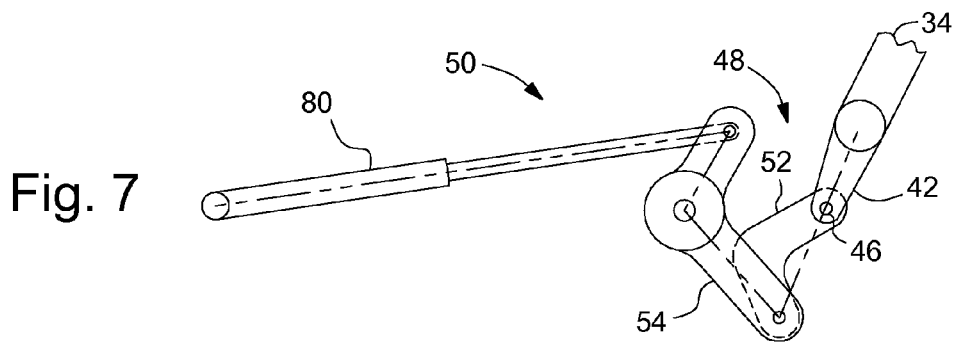
FIG. 7 is a schematic side view similar to FIG. 6, but illustrating the endgate in a partially open, cross-over position.
Figure 8:
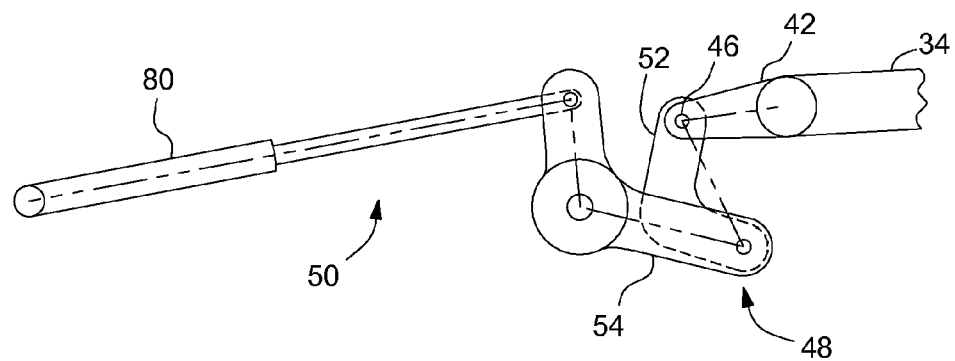
FIG. 8 is a schematic side view similar to FIG. 6, but illustrating the endgate in a fully open position.

The operation of the endgate counterbalance 50 of FIGS. 1-5 will be discussed with reference to schematic FIGS. 6-8. The phantom lines in FIGS. 6-8 extend between the various pivot points of the endgate counterbalance 50. With the endgate 34 in its closed position (FIG. 6), the hinge arm 42 extends downward in a generally vertical direction. This position of the hinge arm 42 positions the links 52, 54 of the crank mechanism 48 so that the gas strut (energy storage device) 80 is somewhat compressed. This compression produces a bias in the endgate opening direction. By having this bias, the endgate 34 preloads the latch assembly (not shown) that holds the endgate 34 closed, thus reducing the potential for squeak and rattle. Moreover, during the last portion of the closing movement to the fully closed position, the endgate counterbalance, having this opening direction bias, will feel as if this last part of the motion is being damped, creating a desirable feel for the person closing the endgate 34.

As the endgate 34 begins to open, the hinge arm 42 will pivot the crank attachment hole 46 forward and upward, actuating the crank mechanism 48 such that the gas strut 80 moves toward its uncompressed position. The endgate 34, then, will reach a cross-over position (shown in FIG. 7) where the endgate counterbalance 50 does not exert a bias in either the opening or closing direction. Pivoting of the endgate 34 in either direction from this position will create a bias back toward this position. The cross-over position allows for greater ease in removal and installation of the endgate 34 from the body 20 since, when the endgate 34 is removed, the biases of the endgate counterbalance will tend to hold the hinge assemblies and locating features (not shown) in place.

As the endgate 34 is rotated past the cross-over position toward the full open position (shown in FIG. 8), the hinge arm 42 will pivot into a generally horizontal position. This pivoting will cause the crank mechanism 48 to again compress the gas strut 80, creating a bias in the endgate closing direction. Thus, when one lifts up on the endgate 34 to close it, the endgate counterbalance 50 will assist by initially biasing the endgate toward the closed position. Moreover, with the energy storage device 80 being a gas strut, the motion will be damped, creating a desirable feeling for the person moving the endgate 34.

Figure 9:
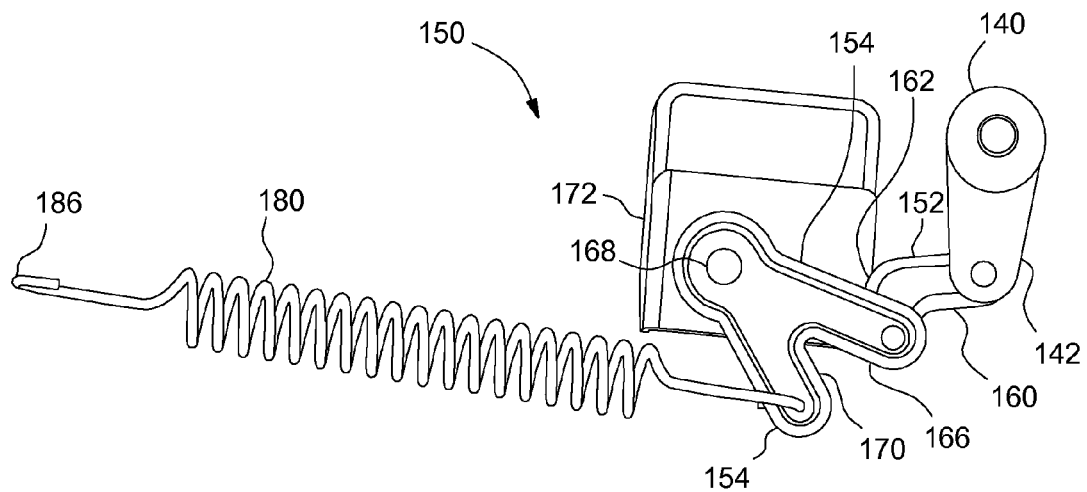
FIG. 9 is a side view of an endgate counterbalance according to a second embodiment.

FIG. 9 illustrates a second embodiment. Since this embodiment is similar to the first, similar element numbers will be used for similar elements, but employing 100-series numbers. In this embodiment, the energy storage device 180 employed is a spring. While not providing all of the damping effect of a gas strut, it may reduce the cost of the overall endgate counterbalance 150. In this embodiment, the hinge 140 still includes a hinge arm 142 that is pivotally connected to the first leg 160 of the hinge pivot link 152. Also, the second leg 162 of the pivot link 152 still pivotally connects to the first leg 166 of the crank pivot link 154, which pivotally connects to structure 172 at the body pivot hole 168. Also, the second leg 170 of the crank pivot link 154 connects to a first end of the spring 180. However, the L-shape of the crank pivot link 154 may be more of a closed angle to accommodate the connection of the forward end 186 of the spring 180 to vehicle structure (not shown in FIG. 9). The endgate counterbalance 150 still functions to provide for a cross-over position, thus allowing for the same functionality as the first embodiment.

Figure 10:
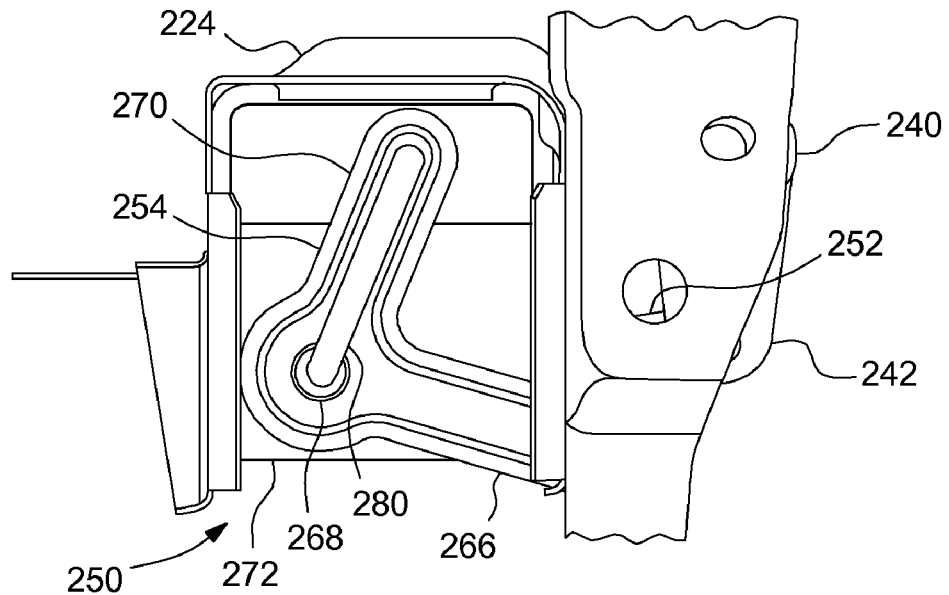
FIG. 10 is a side view of a portion of vehicle structure and an endgate counterbalance according to a third embodiment.
Figure 11:
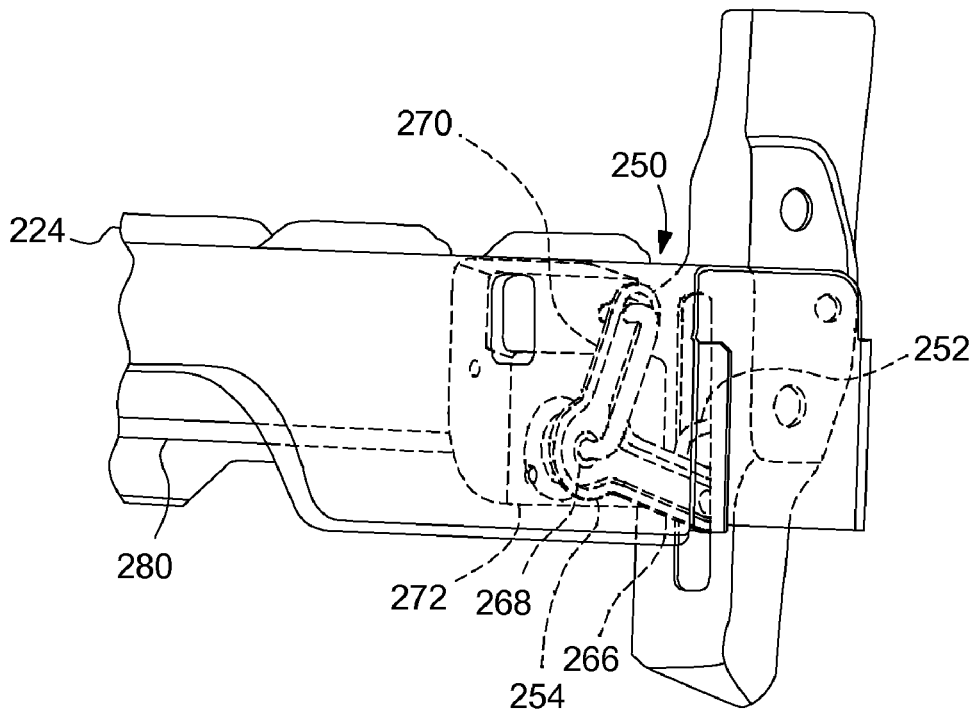
FIG. 11 is a perspective view, on a reduced scale, of the embodiment of FIG. 10.

FIGS. 10-11 illustrate a third embodiment. Since this embodiment is similar to the first, similar element numbers will be used for similar elements, but employing 200-series numbers. In this embodiment, the energy storage device is a torque rod 280 extending horizontally under the box bed 224. While not providing all of the damping effect of a gas strut, it has less sensitivity to temperature changes than the gas strut. The hinge 240 still includes the hinge arm 242 that is pivotally connected to the hinge pivot link 252. Also, the hinge pivot link 252 still pivotally connects to the first leg 266 of the crank pivot link 254, which pivotally connects to structure 272 at the body pivot hole 268. The second leg 270 of the crank pivot link 254 connects to the first end of the torque rod 280. However, the torque rod 280 then extends through the center of the body pivot hole 268 before extending toward a second end (not shown) that is rotationally fixed to vehicle structure (not shown). The endgate counterbalance 250 still functions to provide for a cross-over position, thus allowing for the same functionality as the first and second embodiments.

While certain embodiments of the present invention have been described in detail, those familiar with the art to which this invention relates will recognize various alternative designs and embodiments for practicing the invention as defined by the following claims.

What is claimed is:

1. A vehicle comprising:

vehicle structure having an endgate with a hinge pivotally mounted thereto and movable between a closed position and a fully open position; and an endgate counterbalance including a hinge arm extending from the hinge and pivotally fixed relative to the endgate; an energy storage device having a first end and a second end configured to mount to vehicle structure, the energy storage device configured to store and dissipate potential energy as the first end is moved relative to the second end; and a crank mechanism pivotally connected between the hinge arm and the energy storage device; the endgate counterbalance configured to provide no rotational bias to the endgate when the endgate is in a cross-over position between the closed position and the fully open position and to provide a rotational bias to the endgate when the endgate is not in the cross-over position.

2. The vehicle of claim 1 wherein the vehicle structure includes a box bed, and the energy storage device and the crank mechanism are located under the box bed.

3. The vehicle of claim 1 wherein the energy storage device is a gas strut.

4. The vehicle of claim 1 wherein the energy storage device is a spring.

5. The vehicle of claim 1 wherein the energy storage device is a torsion rod.

6. The vehicle of claim 1 wherein the crank mechanism includes a hinge pivot link, having a first leg and a second leg, and a crank pivot link, having a first leg, a second leg and a pivot location at an intersection of the first and second pivot legs of the crank pivot link, with the first leg of the hinge pivot link being pivotally connected to the hinge arm, the second leg of the hinge pivot link being pivotally connected to the first leg of the crank pivot link, the second leg of the crank pivot link being pivotally attached to the energy storage device, and the pivot location being pivotally connected to the vehicle structure.

7. The vehicle of claim 1 wherein the hinge pivot link is L-shaped.

8. The vehicle of claim 1 wherein the crank pivot link is L-shaped.

* * * * *